US011539786B2

(12) United States Patent
Wang et al.

(10) Patent No.: US 11,539,786 B2
(45) Date of Patent: Dec. 27, 2022

(54) METHOD AND SYSTEM FOR HETEROGENEOUS BLOCKCHAIN SERVICE MANAGEMENT

(71) Applicants: Jeff Wang, San Francisco, CA (US); Jonathan Shih, San Francisco, CA (US); Thomas Manville, Mountain View, CA (US)

(72) Inventors: Jeff Wang, San Francisco, CA (US); Jonathan Shih, San Francisco, CA (US); Thomas Manville, Mountain View, CA (US)

( * ) Notice: Subject to any disclaimer, the term of this patent is extended or adjusted under 35 U.S.C. 154(b) by 612 days.

(21) Appl. No.: 16/688,582

(22) Filed: Nov. 19, 2019

(65) Prior Publication Data

US 2021/0152656 A1    May 20, 2021

(51) Int. Cl.
*H04L 67/10* (2022.01)
*G06F 9/50* (2006.01)

(52) U.S. Cl.
CPC ............ *H04L 67/10* (2013.01); *G06F 9/5027* (2013.01)

(58) Field of Classification Search
CPC ... H04L 67/10; H04L 2209/56; H04L 9/3239; H04L 9/50; H04L 63/12; H04L 67/104; G06F 9/5027
See application file for complete search history.

(56) References Cited

U.S. PATENT DOCUMENTS

| | | | | |
|---|---|---|---|---|
| 2007/0061433 A1* | 3/2007 | Reynolds | ................ | H04L 47/20 709/223 |
| 2010/0220683 A1* | 9/2010 | Novak | .................. | H04L 1/1812 370/336 |
| 2011/0200001 A1* | 8/2011 | Choi | ..................... | H04L 5/0028 370/329 |
| 2013/0235783 A1* | 9/2013 | Wang | ...................... | H04W 4/06 370/312 |
| 2014/0040481 A1* | 2/2014 | Aubin | ..................... | H04L 47/70 709/226 |
| 2015/0319737 A1* | 11/2015 | Cheng | ................... | H04W 72/04 370/329 |
| 2018/0285725 A1* | 10/2018 | Baum | ....................... | G06N 3/02 |
| 2018/0330342 A1* | 11/2018 | Prakash | ........... | G06Q 20/38215 |
| 2019/0340609 A1* | 11/2019 | Mayadas | ............... | H04L 63/123 |
| 2019/0384641 A1* | 12/2019 | Zhao | ......................... | G06T 1/20 |
| 2021/0110049 A1* | 4/2021 | Kumar | .................... | G06F 21/64 |
| 2021/0263779 A1* | 8/2021 | Haghighat | .............. | G06F 21/53 |
| 2021/0287209 A1* | 9/2021 | Nelluri | .............. | G06Q 20/3678 |

* cited by examiner

*Primary Examiner* — Michael Won
(74) *Attorney, Agent, or Firm* — Aslan Law, P.C.

(57) ABSTRACT

A system and method for enabling users to operate multiple blockchain (or distributed ledger) nodes efficiently, at a much lower cost, etc. For example, when one blockchain starts to take up resources, the system can automatically adjust by looking at the application container layer to see if it is possible to shift resources. It can also shift resources at the server layer to adjust for computation and memory resources to, for example, increase efficiency. It may also share storage for nodes that share the same blockchain to, for example, increase efficiency. The system can also identify tokens that are more efficient to stake, and to shift tokens from one blockchain to another for staking reward efficiencies, etc. It may also deploy one node to another geographic region to increase decentralization, as well as adjust rewards and commissions to provide incentives to boost decentralization as well.

12 Claims, 10 Drawing Sheets

METHOD AND SYSTEM FOR HETEROGENEOUS BLOCKCHAIN SERVICE MANAGEMENT

FIELD OF THE INVENTION

The present disclosure generally relates to blockchain technology. More specifically, the present disclosure generally relates to methods, systems, and computer program products relating to operating blockchain services for multiple blockchain protocols and multiple stakeholders simultaneously.

BACKGROUND

Modern commercial enterprises, such as financial institutions, multinational corporations, law firms, and the like, often link together multiple, fragmented, and geographically dispersed business units and lines-of-business. Although operating within a common enterprise, the fragmented nature of these distinct business units and lines-of-business renders complex any attempt to accurately identify and capture the various points of customer interaction across the enterprise. Further, devices operating within these fragmented and geographically dispersed business units and lines-of-business often execute various and often mutually-incompatible software applications (with corresponding mutually-incompatible data inputs and outputs), which often prevents the timely aggregation of data captured across the enterprise devices and the dissemination of the aggregated data within the enterprise. The lack of business-unit and line-of-business integration may lead to an environment characterized by incoherent customer management, which may prevent conventional database architectures from tracking and quantifying occurrences of enterprise-specific events, such as cross-line-of-business referrals and cross-line-of-business interactions. In addition, there may a lack of system organization and optimization.

Blockchain technology is most widely known as the technology behind cryptocurrency, e.g., Bitcoin. A blockchain creates a history of data deposits, messages, or transactions in a series of blocks where each block contains a mathematical summary, called a hash, of the previous block. This creates a chain where any changes made to a block will change that block's hash, which must be recomputed and stored in the next block. This changes the hash of the next block, which must also be recomputed and so on until the end of the chain.

In other words, blockchain technology is built on an ordered series of blocks that contain a set of transactions and references to the previous block. There are numerous protocols that make use of this concept to reach a consensus about a total ordering on transactions. A typical blockchain protocol includes two fundamental roles: clients who wish to add new entries to the chain and independent services that attempt to fulfill requests to add entries to the chain. These protocols revolve around digital tokens called cryptocurrencies. A cryptocurrency's value is determined by its scarcity and value in a protocol.

Blockchain protocols are structured to incentivize operators of services to provide computer resources to support the protocol. Bitcoin for example, incentivizes service providers known as "miners" to compute hashes of sets of transactions and a random value called a "nonce". The miner tries random and different values of the nonce until the resulting block hash meets certain properties. The first miner to find a hash whose meets this property "wins" the block and gets rewarded a number of bitcoins. This incentive encourages bitcoin miners to dedicate a significant number of computer resources towards attempting to win the block.

Bitcoin and other protocols all consume several types of computer resources. The hashing used in a bitcoin algorithm can be performed on many types of hardware, but the most efficient computer resource to perform the hashes used in bitcoin mining is an Application Specific Integrated Circuit, or ASIC.

Like computer programs in general, the computer resources required by blockchain services can be categorized into compute, disk, memory, and networking. The server architecture running a blockchain service is composed of these resources. In the Bitcoin example, a server that includes and ASIC compute resource will be able to calculate a larger number of hashes at a lower cost than one without an ASIC.

Because the dedicated amount of compute resources to validate increases the probability of getting a Bitcoin reward, the consensus model is called "Proof of Work"

There is another method of validating consensus, and that is "Proof of Stake," this does not require heavy compute, but relies on total currency holdings on the miner. This opens up new possibilities for infrastructure efficiency, that strays away from typical high costs compute and more towards utilization of resources.

Blockchain technology and methodologies of cryptocurrency are now being implemented into modern commercial enterprises. However, as the technology of blockchain is new and the implementation of certain blockchain technology and methodology is just beginning, there are major limitations and much room for advancement in the technology and implementation.

For example, in the current state of the art, infrastructures run blockchains protocols and distributed ledgers on dedicated instances or servers. Based on the current state of the art, there is a need for system organization and optimization in blockchain systems.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The disclosure provides, for example, a system and method for efficiently allocating computer resources for multiple blockchain services, including but not limited to sharing resources between different blockchain services of the same protocol and between different protocols.

The disclosure provides, for example, maximizing the net rewards by accounting for operational costs associated with running blockchain services compared to the rewards associated with those services.

The disclosure provides, for example, to optimize latency to other services, failure domains to increase reliability, and the cost of infrastructure, the location of the server where blockchain services run may be taken into account.

The disclosure may, for example, treat tokens as a resource that may be allocated to different types of services within the same protocol or uses external marketplaces to change tokens depending on their value.

The disclosure may, for example, take into account the phases of a protocol when allocating computer resources and tokens.

The disclosure may, for example, expose the system and method as a service to customers who which run blockchain services for their resources, but want to hand off operations to use for a fee (the fee may be dynamic based on incentives, costs and protocol rewards).

An apparatus (and method and a non-transitory computer readable medium having instructions stored thereon, such that when the instructions are read and executed by one or more processors, said one or more processors is configured to perform the method and/or the process of the apparatus) of at least one embodiment of the present invention is an apparatus (and method and a non-transitory computer readable medium having instructions stored thereon, such that when the instructions are read and executed by one or more processors, said one or more processors is configured to perform the method and/or the process of the apparatus) for managing a system of distributed ledgers, where the apparatus including at least a first server layer ($3a$), wherein said first server layer includes at least one first server layer resource ($2a$, a first isolated application domain), said at least one first server layer resource being a resource environment for a first element ($1a_1$), and said first element being a first type of software application (blockchain, Tezo=a) where said first type of software application being managed by and/or controlled by and/or assigned to a first user.

An apparatus of at least one embodiment of the present invention is an apparatus wherein said first server layer includes a second first server layer resource ($2b$, a second isolated application domain), said second first server layer resource being a resource environment for a second element ($1b_1$), and said second element being a second type of software application (blockchain, Harmony=b) where said second type of software application being managed by and/or controlled by and/or assigned to the first user.

An apparatus of at least another embodiment of the present invention is an apparatus that includes at least a first server and/or controller configured and/or program to control and/or contain said first server layer ($3a$), wherein said server allocates resources from said at least one first server layer resource ($2a$) to said second first server layer resource ($2b$) based on the determination that said at least one first server layer resource ($2a$) has available resources and/or based on the determination that said at least one second server layer resource ($2b$) needs available resources.

An apparatus of at least an embodiment of the present invention is an apparatus that includes at least a second server layer ($3x$), wherein said server allocates said at least one first server layer resource ($2a$) and/or said second first server layer resource ($2b$) from said first server layer ($3a$) to said second server layer ($3x$) based on the determination that said first server layer ($3a$) needs available resources and/or based on the determination that said second server layer ($3x$) has available resources.

An apparatus of at least another embodiment of the present invention is an apparatus that includes at least a first server and/or controller configured and/or program to control and/or contain said first server layer ($3a$); and a second server layer ($3x$), wherein said first server and/or controller configured and/or program to control and/or contain said second server layer ($3x$), and said server allocates said at least one first server layer resource ($2a$) from said first server layer ($3a$) to said second server layer ($3x$) based on the determination that said first server layer ($3a$) needs available resources and/or based on the determination that said second server layer ($3x$) has available resources.

An apparatus of at least one embodiment of the present invention is an apparatus wherein said second server layer includes a first second server layer resource ($2d$, another isolated application domain), and said server allocates resources from said at least one first server layer resource ($2a$) to said first second server layer resource ($2d$) based on the determination that said at least one first server layer resource ($2a$) has available resources and/or based on the determination that said first second server layer resource ($2d$) needs available resources.

An apparatus of at least one embodiment of the present invention is an apparatus wherein said second server layer includes a first second server layer resource ($2d$, another isolated application domain), and said server allocates resources from said first second server layer resource ($2d$) to said at least one first server layer resource ($2a$) based on the determination that said first second server layer resource ($2d$) has available resources and/or based on the determination that said at least one first server layer resource ($2a$) needs available resources.

A method of at least one embodiment of the present invention is a method for managing a system of distributed ledgers, wherein the system including a first server layer ($3a$), wherein said first server layer includes at least one first server layer resource ($2a$, a first isolated application domain), said at least one first server layer resource being a resource environment for a first element ($1a_1$), said first element being a first type of software application (blockchain, Tezo=a) where said first type of software application being managed by and/or controlled by and/or assigned to a first user, said first server layer includes a second first server layer resource ($2b$, a second isolated application domain), said second first server layer resource being a resource environment for a second element ($1b_1$), and said second element being a second type of software application (blockchain, Harmony=b) where said second type of software application being managed by and/or controlled by and/or assigned to the first user, and a first server and/or controller configured and/or program to control and/or contain said first server layer ($3a$), wherein said method includes are least the steps of determining whether said at least one first server layer resource ($2a$) has available resources and/or determining whether said at least one second server layer resource ($2b$) needs available resources; and allocating resources from said at least one first server layer resource ($2a$) to said second first server layer resource ($2b$) based on said determination that said at least one first server layer resource ($2a$) has available resources and/or based on the determination that said at least one second server layer resource ($2b$) needs available resources.

A method of at least one embodiment of the present invention is a method where the system including a second server layer ($3x$) wherein said method includes are least the steps of allocating said at least one first server layer resource ($2a$) and/or said second first server layer resource ($2b$) from said first server layer ($3a$) to said second server layer ($3x$) based on the determination that said first server layer ($3a$) needs available resources and/or based on the determination that said second server layer ($3x$) has available resources.

A method of at least one embodiment of the present invention is a method for managing a system of distributed ledgers, wherein the system including a first server layer ($3a$), wherein said first server layer includes at least one first server layer resource ($2a$, a first isolated application domain), said at least one first server layer resource being a resource environment for a first element ($1a_1$), said first element being a first type of software application (blockchain, Tezo=a) where said first type of software application being managed by and/or controlled by and/or assigned to a first user, a first server and/or controller configured and/or program to control and/or contain said first server layer ($3a$), a second server layer ($3x$), and said first server and/or controller configured and/or program to control and/or contain said second server layer ($3x$), wherein said method includes are least the steps of determining whether said first server layer ($3a$) needs available resources and/or determining whether said second server layer ($3x$) has available resources; and allocating said at least one first server layer resource ($2a$) from said first server layer ($3a$) to said second server layer ($3x$) based on the determination that said first server layer ($3a$) needs available resources and/or based on the determination that said second server layer ($3x$) has available resources.

A method of at least one embodiment of the present invention is a method where said second server layer includes a first second server layer resource ($2d$, another isolated application domain), wherein said method includes are least the steps of allocating resources from said at least one first server layer resource ($2a$) to said first second server layer resource ($2d$) based on the determination that said at least one first server layer resource ($2a$) has available resources and/or based on the determination that said first second server layer resource ($2d$) needs available resources.

A method of at least one embodiment of the present invention is a method where said second server layer includes a first second server layer resource ($2d$, another isolated application domain), wherein said method includes are least the steps of allocating resources from said first second server layer resource ($2d$) to said at least one first server layer resource ($2a$) based on the determination that said first second server layer resource ($2d$) has available resources and/or based on the determination that said at least one first server layer resource ($2a$) needs available resources.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Figure 1:
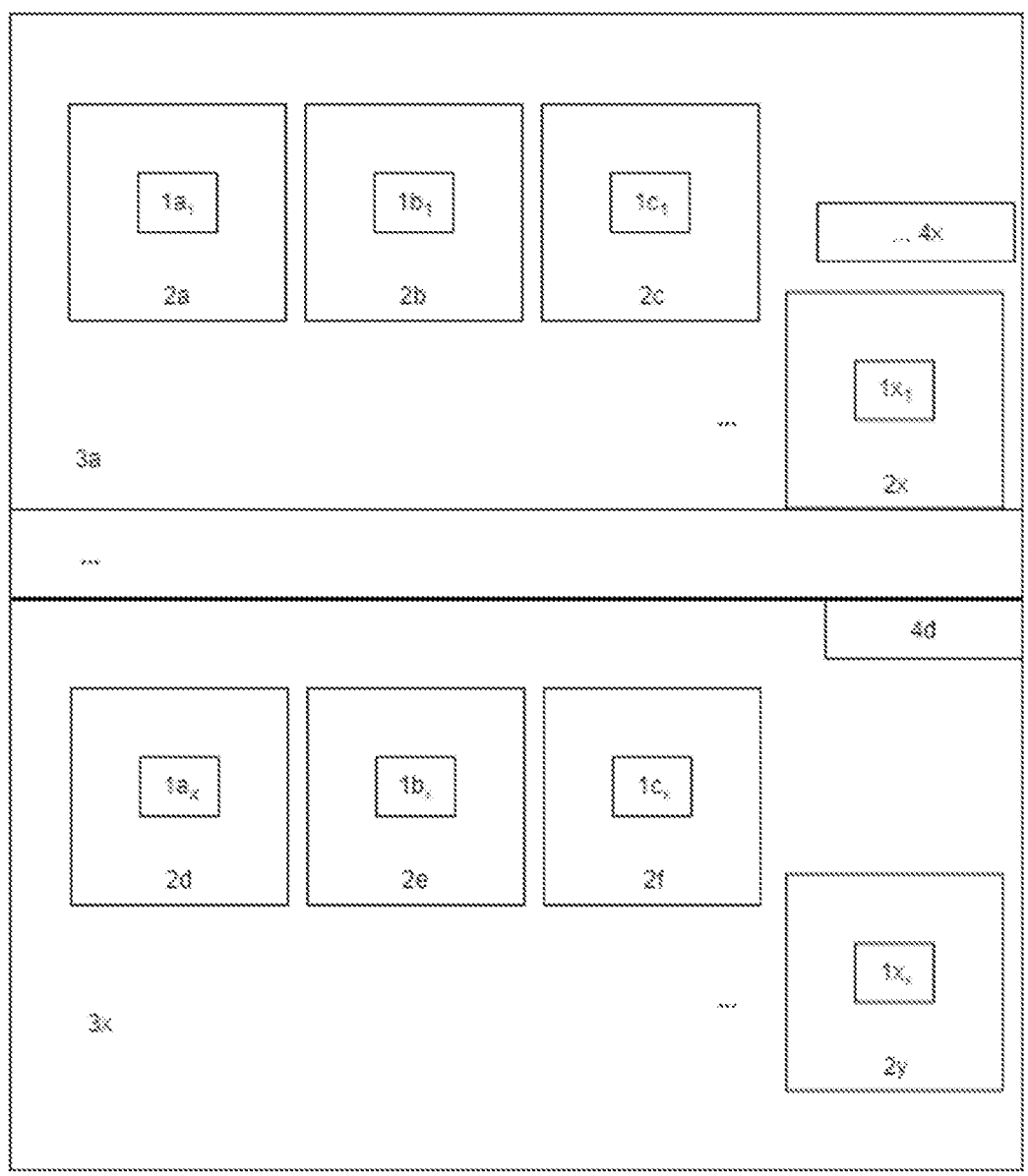
FIG. 1 is a functional high-level block diagram illustrating an arrangement of an infrastructure management of multiple blockchains (for example, Tezos, Harmony, Cosmos chains, etc.) according to one or more embodiments described herein.

This disclosure is not limited to the particular systems, devices and methods described, as these may vary. The terminology used in the description is for the purpose of describing the particular versions or embodiments only, and is not intended to limit the scope. Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Descriptions of well-known starting materials, processing techniques, components and equipment may be omitted so as not to unnecessarily obscure the invention in detail. It should be understood, however, that the detailed description and the specific examples, while indicating (e.g., preferred) embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.) or the like. In various embodiments, the computer has access to at least one database over the network.

ROM, RAM and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

The following terms shall have, for the purposes of this application, the respective meanings set forth below.

A "user" refers to one or more entities or people using any of the components and/or elements thereof as described herein. In some embodiments, the user may be a user of an electronic device. In other embodiments, the user may be a user of a computing device. Users described herein are generally either creators of content, managers of content, merchants, and/or consumers. For example, a user can be an administrator, a developer, a group of individuals, a content provider, a consumer, a merchant, a representative of another entity described herein, and/or the like.

An "electronic device" refers to a device that includes a processor and a tangible, computer-readable memory or storage device. The memory may contain programming instructions that, when executed by the processing device, cause the device to perform one or more operations according to the programming instructions. Examples of electronic devices include personal computers, supercomputers, gaining systems, televisions, mobile devices, medical devices, recording devices, and/or the like.

A "mobile device" refers to an electronic device that is generally portable in size and nature or is capable of being operated while in transport. Accordingly, a user may transport a mobile device with relative ease. Examples of mobile devices include pagers, cellular phones, feature phones, smartphones, personal digital assistants (PDAs), cameras, tablet computers, phone-tablet hybrid devices ("phablets"), laptop computers, netbooks, ultrabooks, global positioning satellite (GPS) navigation devices, in-dash automotive components, media players, watches, and the like.

A "computing device" is an electronic device, such as a computer, a processor, a memory, and/or any other component, device or system that performs one or more operations according to one or more programming instructions.

A "user interface" is an interface which allows a user to interact with a computer or computer system. A user interface may generally provide information or data to the user and/or receive information or data from the user. The user interface may enable input from a user to be received by the computer and may provide output to the user from the computer. Accordingly, the user interface may allow a user to control or manipulate a computer and may allow the computer to indicate the effects of the user's control or manipulation. The display of data or information on a display or a graphical user interface is a non-limiting example of providing information to a user. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are non-limiting examples of user interface components which enable the receiving of information or data from a user.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

The functions of the various devices described herein with respect to at least FIGS. 1-9 represents an improvement in the functionality of general computing devices known in the art, and thus teach significantly more than existing technology, by providing an ability to efficiently . . . . Such devices may include a plurality of components, such as the components described herein with respect to at least FIG. 10. The functions of the various devices described herein with respect to at least FIGS. 1-9 may also provide entities with an ability for system organization and optimization, etc. that were previously nonexistent and would not be possible without the various computing devices, server devices and electronic devices herein. Such system organization and optimization, etc. would not be feasible without implementation of the devices described herein.

FIG. 1 is a functional high-level block diagram illustrating an arrangement of an infrastructure management of multiple blockchains (for example, Tezos, Harmony, Cosmos chains, etc.) according to one or more embodiments described herein.

In the Figures e.g., in at least FIG. 1, server layers are provided (3a . . . 3x, $x$ being any number greater than or equal to 1).

A first server layer (3a) may include for example elements $1a_1, 1b_1, \ldots 1x_1$ while a second server layer (3x) may include for example elements $1a_2, 1b_2, \ldots 1x_2$; where the first character (e.g., "1" of $1a_1, 1b_1, \ldots 1x_1$) represents a blockchain, where the second character (e.g., "a," "b," . . . "x" of $1a_1, 1b_1, \ldots 1x_1$) represents the types of blockchains (for example, a=Tezos, b=Harmony, x=Cosmos), and the third character (e.g., the sub numbers $_1, _2, \ldots$ (sub numbers start at one and can be any number equal to or greater than 2)) representing the owner(s) (for example, xxi is an application instance belonging to a first owner/owner 1 (e.g., Jeff), xxx is an application instance belonging to a second owner/owner x (e.g., Tom). It should be noted that while each server is disclosed to be "owned" (or managed) by different owners, a single owner or entity can also own (or manage) more than one server.

It should be noted that, while it is not illustrated, it is possible for this system to generate more than one blockchain per owner. For example, one scenario would be that an owner has one blockchain for mining/validating, and the other for data retrieval and/or other utilities. Another utility could be a backup, in case one node goes down there is another to bring back up.

In the Figures e.g., at least FIG. 1, elements 2a, 2b, 2c, 2d, . . . 2x each represent isolated application domains (for example, an isolated application domain may be a docker container hosting a blockchain, an isolated application domain may be a Kubernetes container, etc.).

It should be noted that a container may be a standard unit of software that packages up code and all its dependencies, so the application runs quickly and reliably from one computing environment to another. It should also be noted that a docker container image may be a lightweight, standalone, executable package of software that includes everything needed to run an application: code, runtime, system tools, system libraries and settings. Accordingly, container images become containers at runtime and in the case of Docker containers—images become containers when the container images run on a Docker Engine. Available for both Linux and Windows-based applications, containerized software will always run the same, regardless of the infrastructure. Containers isolate software from its environment and ensure that it works uniformly despite differences for instance between development and staging.

The types of Docker containers that may run on a Docker Engine include for example:
Standard Docker containers: Docker created the industry standard for containers, so they could be portable anywhere.
Lightweight Docker containers: Containers share the machine's OS system kernel and therefore do not require an OS per application, driving higher server efficiencies and reducing server and licensing costs.
Secure Docker containers: Applications are safer in containers and Docker provides the strongest default isolation capabilities in the industry.

Server layers (3a, . . . , 3x) may represent different server layers, e.g., a virtual machine (VM) in a cloud provider, and/or a physical server, and/or a hosting computer, and/or etc.). The second character (e.g., a, . . . x) of the Server layers labeling (3a, . . . , 3x) represents the (different) owners. For example, 3a may be a server owned by a first owner/owner 1 (e.g., Jeff) that hosts docker(s) e.g., 3 dockers containing Tezos, Harmony, and Cosmos while 3x may be a server owned by a second owner/owner x (e.g., Tom) that hosts docker(s) e.g., 3 dockers also containing Tezos, Harmony, and Cosmos.

Each server layer may include one or more storage devices (storage server(s), data center(s), file server(s), direct attached storage(s) (DAS), network attached storage(s) (NAS), etc.). For example, server layer 3a may include storage devices 4a, 4b, . . . 4x while server layer 3x may include a storage 4d (server layer 3x may also include more than one storage device and/or 4d can be partitioned to more than one storage area).

For example, storages 4a, 4b, . . . 4x may represent the corresponding blockchain storages for the owner of 3a while the storages of 3x (e.g., 4d) may represents a temporary storage for the owner of 3x. In an example, 4a may be a storage volume for Tezos, 4b may be a storage volume for Harmony, 4x may be a storage volume for Cosmos, and 4d may represent a volume of storage that is a temporary place of storage before transferring the blockchain back to 4a, 4b, or 4x. In this example, all of the first Owner's (Jeff's) blockchains (identified by "i") and corresponding storage of the ledger are located on Virtual Machine 3a, for 3x, all of the second Owner's or more specifically Owner x's, (e.g., Tom's) blockchains are temporarily stored in 4d on server 3x, while the rest of the storage is being shared with the storage that is being used by 3a, but there is no full chain or ledger stored on 3x. By sharing the storage from 4a, 4b, . . . 4x, Owner x's (Tom's) chain is leveraging the storage on from 3a without needing to pay for additional storage, providing efficient use of storage, etc.

The reverse may also be implemented where, for example, the storage(s) of 3x, e.g., storage 4d, may represent the corresponding blockchain storage(s) for the owner of 3x while storages 4a, 4b, . . . 4x may represent temporary storage(s) for the owner of 3a. In an example, 4d may be a storage volume for a blockchain and 4a, 4b, . . . and/or 4x may represent a volume of storage that is a temporary place of storage before transferring the chain back to 4d.

It should be noted that a (full) storage needs to live (to be stored) somewhere, for example, it can be (e.g., temporarily) stored on 4a, 4b, . . . 4x but it is not required to (e.g., temporarily) reside on any one server, e.g., not required to reside on server 3a, it may be a volume that is in the same infrastructure that is assigned to server 3a.

Accordingly, the disclosure describes a system and method for at least supporting for multiple node runners. FIG. 1 for example describes the system and method at a high-level, with blockchains living on application containers, and living on top of virtual machines. At each layer, as illustrated in at least FIGS. 2-5, the system and method may allocate resources to help keep efficient and/or costs low. In addition, the storage that may be shared among the individual blockchains across servers is illustrated in at least FIG. 5.

Figure 2:
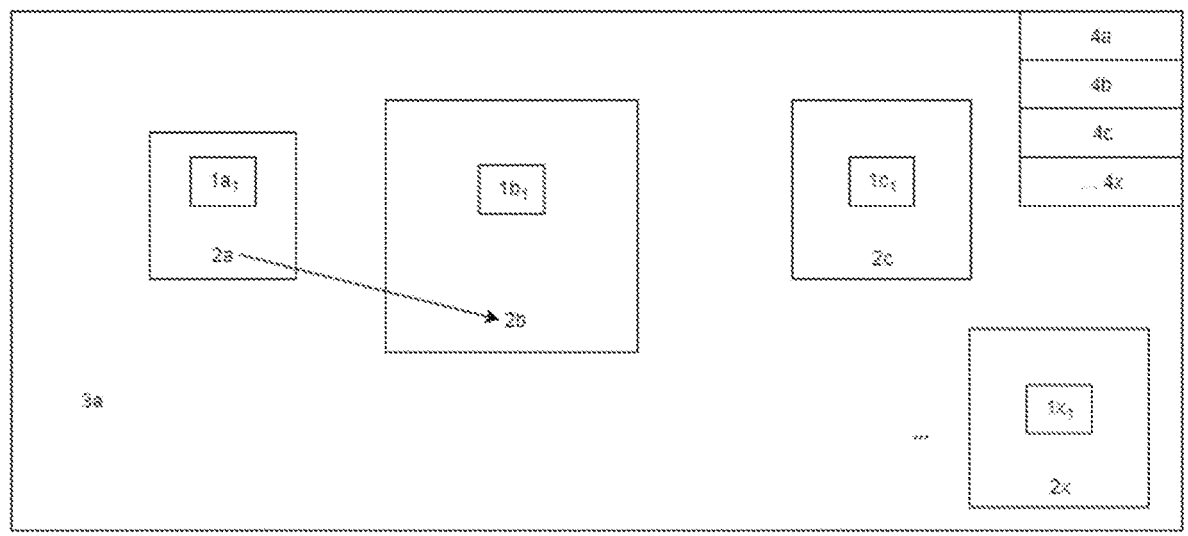
FIG. 2 is a functional high-level block diagram illustrating the shifting of application container resources from different blockchains on the same server for efficiency according to one or more embodiments described herein.

FIG. 2 is a functional high-level block diagram illustrating the shifting of application container resources from different blockchains on the same server for efficiency. In regard to at least FIG. 2, the application container resources may be Kubernetes, and/or a docker container, and/or etc.

It should be noted that while FIG. 2 illustrates allocation within the same server, this allocation method can be performed within the same server and/or, between two servers, and/or between more than two servers, and so on. For example, an allocation can be made 2a to 2b, 2b to 2a, 2a to 2c, 2c to 2a, 2a to 2d, 2d to 2a, and so on.

It should be noted that the size of the boxes in the Figures may represent certain differences, for example, differences in the amount of resources dedicated to an application container, the difference in the size of storage allocated or used, etc. For example, in at least FIG. 2, the different sizes of the boxes (e.g., 2a, 2b, ... 2x) may represent the different amount of resources dedicated to an (each) application container. Accordingly, as illustrated in the example of at least FIG. 2, element 2b (e.g., docker container 2b) has more capacity for resources than element 2c, and element 2c has more capacity for resources than element 2a.

For example, in the Figures e.g., in at least FIG. 2, 2a represents a docker container hosting Tezo blockchain for Owner 1's (Jeff's) server 3a. When server 3a determines that 2a has available resources (e.g., due to low requirements for bandwidth, and/or due to a period of time where $1a_1$ is not required to take action, and/or etc.), server 3a automatically allocates (some of or all of) the resources of 2a to 2b. For example, server 3a automatically allocates CPU resources and/or RAM resources and/or a certain % of capacity (e.g., a certain % of memory capacity) of 2a to 2b so that $1b_1$ can utilize for example the extra computation power that 2b needs to host Harmony blockchain.

In other words, when server 3a realizes/determines that 2a does not need resources (e.g., 2a has available resources), server 3a searches/looks for where to allocate (some or all of) the resources assigned to 2a which for example is 2b. Similarly, when server 3a realizes/determines that 2b needs resources, server 3a searches/looks for what (e.g., which docket container(s)) may assist 2b, which could be for example, 2a.

Accordingly, in the Figures e.g., in at least FIG. 2, it is illustrated that server 3a has automatically allocated the most resources to 2b and the least resources to 2a with the resources allocated to 2c are allocated to have less than 2b but more than 2a.

Furthermore, server 3a may determine and allocate resources of server 3x to server 3a. Similarly, server 3x may determine and allocation of its own server to/from one or more other servers.

It should be noted that the system is not limited to only server 3a being able to determine and allocate resources of server 3x to server 3a. For example, it may reside on any server and/or it may be a controller is used to monitor separate servers. In addition, the controller is not limited to reside on server 3a, as for example, the controller being an agent installed on each server and then a host server to communicate between them (between the servers). Accordingly, the controller may reside on any server and/or any other node in the system.

In addition, a controlling server and/or master server may have exclusive or joint/collaborative control for the determination and allocation of all servers.

Figure 3:
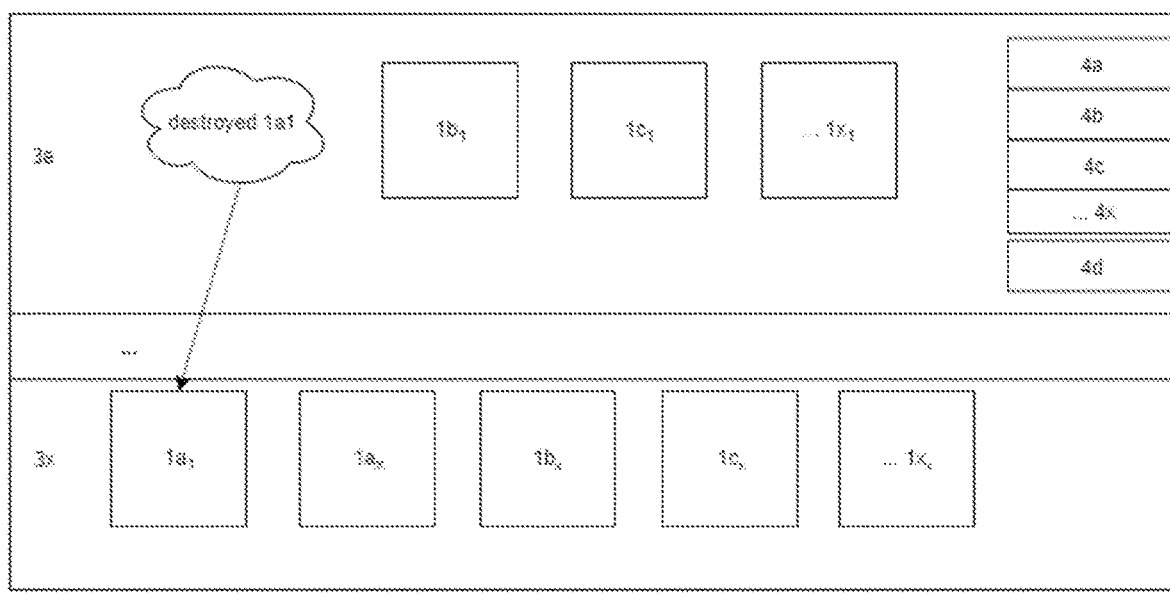
FIG. 3 is a functional high-level block diagram illustrating the shifting of application containers of a blockchain from one server to another according to one or more embodiments described herein.

FIG. 3 is a functional high-level block diagram illustrating the shifting of application containers of a blockchain from one server to another according to one or more embodiments described herein. It should be noted that the shifting of application containers of a blockchain from one server to another has numerous benefits to the system and method disclosed herewith, for example, for efficiency of decentralization.

At least FIG. 3 illustrates numerous functionalities of the system and method, e.g., the ability to create a blockchain from a template, and/or the ability to destroy a blockchain, and/or the ability to move an existing blockchain from one server to another, and/or etc. FIG. 3 provides numerous benefits of the movement of a blockchain from one server to another server, for example, by making resources available to a server that is running close to capacity.

For example, in the Figures e.g., in at least FIG. 3, when it is automatically determined that a second server like server 3x (e.g., a Virtual Machine 3x) has available resources and/or it is automatically determined that a first server like server 3a (e.g., a Virtual Machine 3a) does not have (any or enough) available resources and/or it is automatically determined that the first server needs additional resources and/or it is automatically determined that the second server has a certain predetermined % of available resources more than the first server (e.g., the second server has 20% or more available resources more than the first server), etc., then the first server 3a is automatically instructed and/or automatically forced to destroy (or remove or temporary remove or transfer or temporarily transfer or etc.) a resource (e.g., $1b_1$) and is automatically instructed and/or automatically forced to shift that resource to the second server 3x.

It should be noted that while it is disclosed (e.g., in the example above) that the resource $1b_1$ is destroyed, any resource(s) may be determined to be destroyed (removed, transferred, etc.). For example, it may be determined to destroy one resource vs another based on resource efficiency (e.g., if a first resource is taking up more (or a lot more) resources and a second resource can fit more optimally somewhere else, then the second resource should be the resource that should be moved. Alternatively, or used in conjunction with other criteria (e.g., resource efficiency), it may be determined to destroy one resource vs another based on peak bandwidth for different ledgers. For example, peak bandwidth may correspond to the maximum amount of resources required to run a distributed ledger or blockchain, and peak bandwidth may occur when a node encounters processing that is heavier than normal, which may include validation, smart contracts processing, heavy transaction volume and/or the like.

In other words, because Virtual Machine 3x has resources to utilize, Owner 1's (Jeff's) $1b_1$ blockchain of Harmony is (temporarily and/or permanently) destroyed and (temporarily and/or permanently) recreated (or relocated) on Virtual Machine 3x to utilize the extra resources, etc. Thus, Virtual Machine 3a is now utilizing the extra computation power, etc. that was needed and/or provided a method for more efficiently uses resources, etc.

Figure 4:
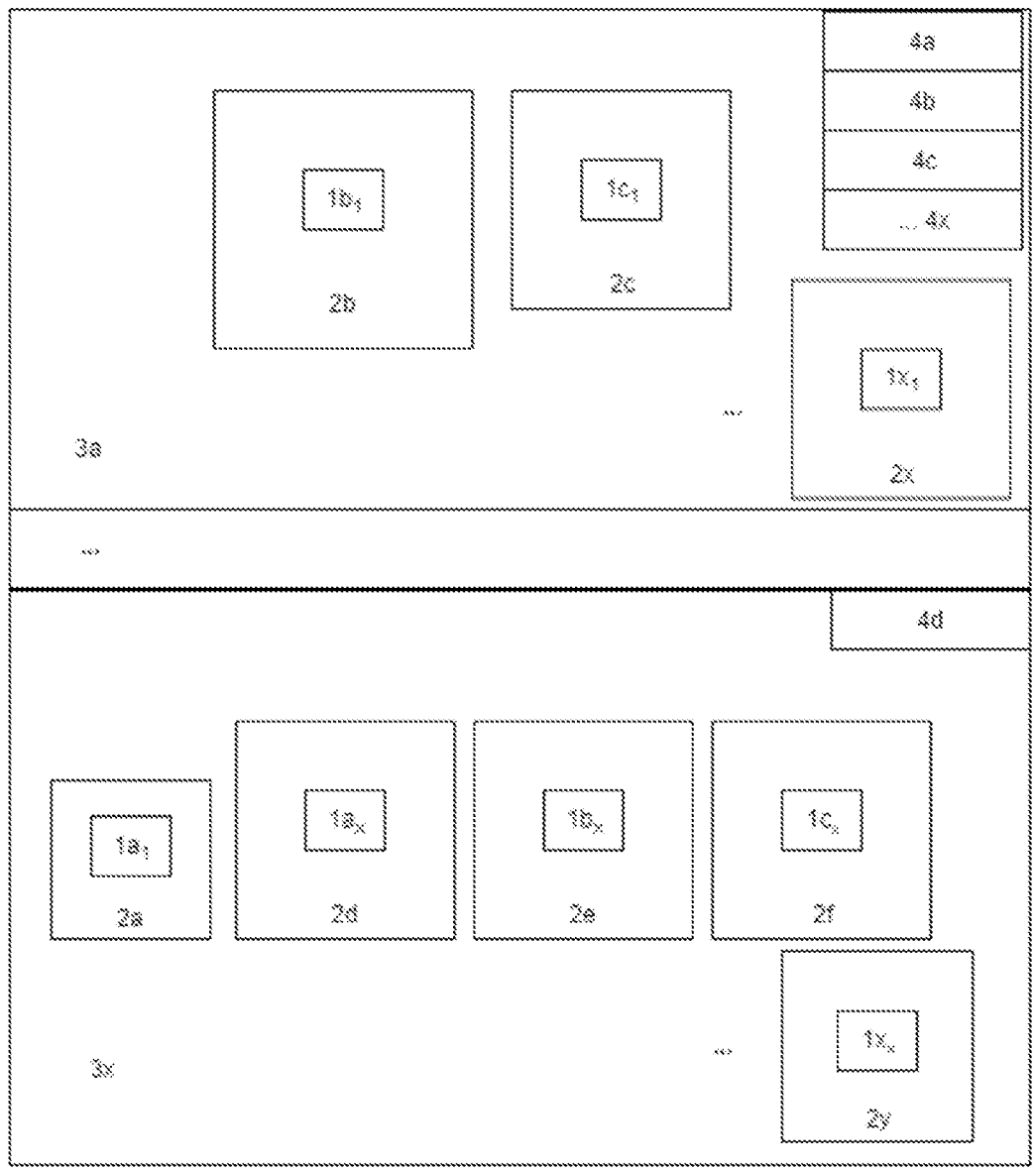
FIG. 4 is a functional high-level block diagram illustrating some of the shifting procedures being used together according to one or more embodiments described herein.

FIG. 4 is a functional high-level block diagram illustrating some of the shifting procedures being used together according to one or more embodiments described herein.

More specifically, FIG. 4 illustrates an example of the features/functions of at least FIGS. 1 through 3 being used in combination.

For example, in at least FIG. 4, server 3a determines that 2b has available resources and automatically allocates some of (or all of) the resources of 2a to 2b. Afterwards, server 3a automatically determines that a second server (server 3x) has available resources (and/or for other determinations as disclosed in this disclosure, etc.), then the first server 3a is automatically instructed and/or automatically forced to destroy (or remove or temporary remove or transfer or temporarily transfer or etc.) a resource (e.g., 2a/1a_1) and is automatically instructed and/or automatically forced to shift that resource to the second server 3x. However, it should be noted that, the destruction and transfer of 2a on 3a to 3x could have been done first and then the allocation of sizing within 3x (e.g., allocating less to 2a and more to 2d, 2e, 2f, and/or 2y) after destruction/transfer. Hence, one of more features of one or more Figures may be combined with one of more features of another or more Figures.

Figure 5:
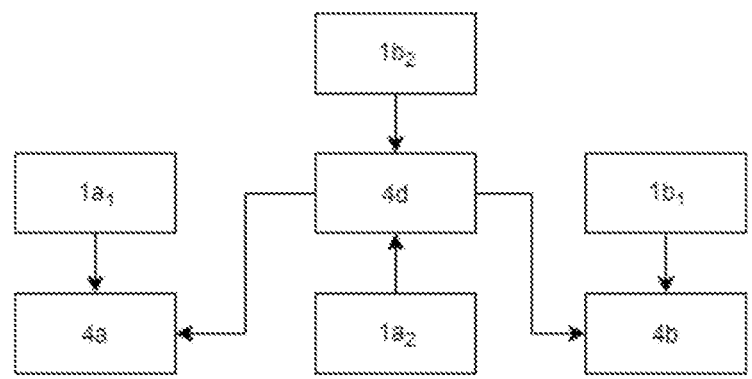
FIG. 5 is a functional block diagram illustrating an example of a shared storage of blockchains.

Accordingly, FIG. 5 is a functional block diagram illustrating an example of a shared storage of blockchains according to one or more embodiments described herein. More specifically, FIG. 5 is a functional block diagram illustrating an example that represents the configuration of at least FIGS. 1-4 where shared storage of blockchains $1a_1$ and $1a2$ with $4a$ storage, and $4d$ temporary storage for $1a_2$, as well as shared storage of $4b$ with blockchains $1b_1$ and $1b_2$, where $1b_2$ has a temporary storage with $4d$ as well. By sharing $4a$ and $4b$, the storage resources required are cut almost in half. It is noted that a blockchain stores data in "blocks," meaning every shared ledger retains the units of those blocks. For example, Owner 1 (Jeff) may send Owner 3 (Jonathan) $10, Owner 3 (Jonathan) send Owner 2 (Tom) $5, and a block passes, that means in the first block, Owner 1 (Jeff) lost $10 and Owner 3 (Jonathan) and Owner 2 (Tom) have gained $5. Now Owner 2 (Tom) sends Owner 1 (Jeff) $5, another block passes. Basically, all the transactions that have every happened get stored in these blocks and the shared ledger only care about the last block in order to "connect" to it.

Accordingly, in order to optimize the matter that multiple ledgers all need to store the same data, the system may address this issue, for example, in at least FIG. 5, it is illustrated that it may be a waste of space for e.g., 2 different blockchain systems to be storing the same data twice. Therefore, the system is able to separate the duplicate data (or at least some of it) and then save the money on needing double the storage. Thus, the block that has all our transactions gets stored in one place instead of two, but, the last block might still be stored in both blockchain systems. One benefit of a shared ledger is in fact to keep two complete copies, while in aspects of this system, the hassle by storing it once for two clients may be eliminated.

In FIG. 5, a first type of Blockchain (e.g., Tezos Blockchain) is run by two different owners shown as $1a_1$ and $1a_2$, where the first type of Blockchain (e.g., Tezos Blockchain) shares a common distribution ledger. $1a_1$ (Tezos blockchain owner 1, e.g., Jeff) has the entire chain stored on $4a$ storage. $1a_2$ (Tezos blockchain owner 2, e.g. Tom) uses $4d$ storage as a place to make operations such as but not limited to, transactions, or validations, or the like. When these operations are complete, they are then linked back to the main ledger on storage $4a$. Ultimately, $1a_1$ (Jeff's Tezos node) and $1b_2$ (Tom's Tezos node) both share the same ledger, yet operate as two separate systems. The behavior can be shown for example with Harmony blockchain ($1b_1$ and $1b_2$), $1b_1$, a second blockchain such as Harmony and owned by Jeff, accesses the latest blocks of the ledger through local storage $4b$, the second Harmony node $1b_2$, such as a Harmony node owned by Tom, uses the storage $4d$ to process temporary operations that will eventually connect to volume $4b$ for the rest of the ledger. Ultimately, the blockchains for $1b_1$ (Jeff's Harmony node), and $1b_2$ (Tom's Harmony node), will end up sharing the same ledger yet act as two separate systems. Accordingly, at least one benefit of this is that it ultimately saves storage costs by not needing multiple copies of the same storage.

Figure 6:
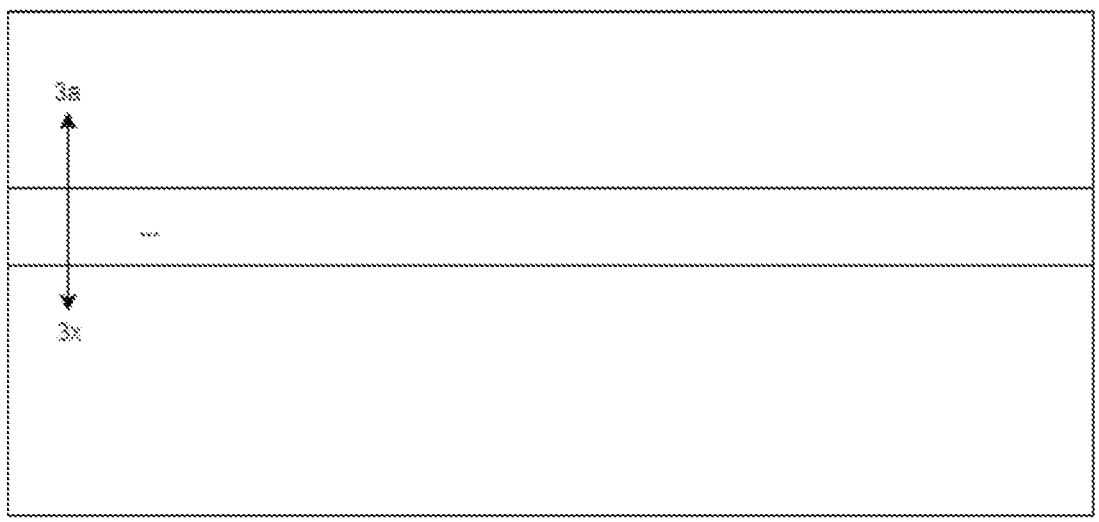
FIG. 6 is a functional block diagram illustrating an example of the shifting of virtual machine resources from one server to another to help out another system of blockchains (size of area indicated the amount of compute or memory allocation).

FIG. 6 is a functional block diagram illustrating an example of shifting of resources e.g., virtual machine resources from one server to another server to help out another system of blockchains (size of area indicated the amount of compute or memory allocation). In other words, FIG. 6 provides numerous benefits by the procedure of moving resources at the server layer, for example, making available the computation and memory resources for another server.

It should be noted that while in FIG. 2 the type of resource being shifted may be an application container (like Kubernetes, and/or a docker container, and/or etc.), in FIG. 6, the type of resource being shifted may be at the Server resource level (e.g., physical allocation of CPU/RAM at the compute layer, like a physical machine with multiple Virtual Machines, and the resizing of them). Accordingly, the features of one Figure (e.g., FIG. 2) can be used in a similar fashion as another Figure (e.g., FIG. 6), or vice versa.

For example, in at least FIG. 6, a first server (e.g., server 3a which is owned by Owner 1 (e.g., Jeff)) may have available resources that a second server (e.g., sever 3x which is owned by Owner x (e.g., Tom)) may need to borrow some (or all) of the available resources of the first server. Accordingly, the first server (e.g., server 3a) lends some (or all) of the available resources (e.g., CPU, and/or RAM, and/or etc.) to the second server (e.g., sever 3x). This, for example, provides numerous benefits like improving the performance of the second server (e.g., sever 3x). Similarly, one or more servers may have available resources that one or more other servers may need to use, so the one or more servers may simultaneously and/or in a sequential process allocate available resources to the one or more other servers. It should be noted that this allocation may be used with any or all other embodiments, any or all Figures, etc.

Figure 7:
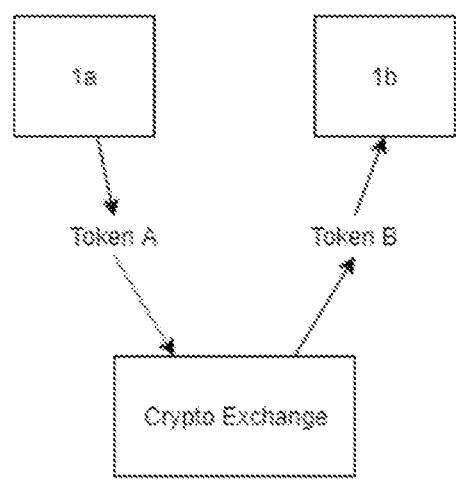
FIG. 7 is a functional block diagram illustrating an example of the shifting of staking token resources from a first blockchain to a second blockchain via an intermediate node (e.g., a Crypto Exchange processing node).

FIG. 7 is a functional block diagram illustrating an example of the shifting of staking token resources from at least a first blockchain to at least a second blockchain via at least one intermediate node (e.g., a Crypto Exchange processing node). In other words, FIG. 7 illustrates an example of how the system and method may move a token resource(s) from one blockchain to another blockchain via one intermediate node.

It should be noted that according to at least FIG. 7, the Crypto Exchange may be done (e.g., in relation to $1a$ and $1b$) programmatically. For example, in a blockchain system with keys that hold some amount of currency, the system may send those items to an exchange via an API to exchange it for another type of currency.

In addition, the Crypto Exchange may be used as a staking resource. In Proof of Stake blockchain mining, the amount of currency one holds in their blockchain system determine the reward amount. For example, if using Tezos and Harmony, where Tezos is generating at a certain annualization with a user's certain investment amount (e.g., $10,000, 10% annualized—amounting to $1,000 a year) and where Harmony is generating at a certain higher annualization (e.g., 15% annualized), then some or all of the user's certain investment amount (e.g., some or all of the $10,000) can be exchanged to Harmony to take advantage of the higher (e.g., 5% advantage) annualization.

In the Figures, e.g., in at least FIG. 7, at least one token, Token A (e.g., Tezos) is provided from a first blockchain to a Crypto Exchange based on a certain criterion or a certain set of criteria occurring and/or being detected/determined (e.g., meeting and/or surpassing a certain threshold criteria). For example, a certain criterion may be that Token A changes (e.g., increases/decreases) in value by a certain predetermined value (e.g., 5%, 10%, 20%, 25%, etc.)—coin price fluctuations, and/or Token A changes (e.g., increases/decreases) in value by a certain predetermined dividend return value (e.g., 5%, 10%, 20%, 25%, etc.), and/or a large supply of Tokens being (and/or about to be) released/made available to the system (e.g., for purchase), and/or a company or organization about to and/or has been liquidated (gone out of business, etc.), and/or a major exploit discovered, and/or it is determined that the Exchange has been hack or compromised, and/or etc.

Based on any of these predetermined occurrences, Token A may be automatically sent from container $1a$ to the Crypto Exchange for an exchange to Token B which has increased by at least a certain predetermined value (e.g., 5%, 10%, 20%, 25%, etc.), and/or Token B increased by at least a certain predetermined dividend return value (e.g., 5%, 10%, 20%, 25%, etc.), etc. and then Token B is automatically sent to mining container $1b$. This provides for numerous benefits, for example, providing an increase in rewards, maximizing return, etc. Another example is for delegations, which is the process of allowing the public to reserve their tokens to your node (e.g., a system Owner's node, Owner 1's node, Owner 2's node, etc.) in order to share on dividends, this provides for at least an ability to stake more tokens for an increase in dividends. In addition, this may allow for some blockchain systems to benefit from an increase in capacity based on how many tokens are attached to the blockchain being mined. To illustrate this in an example, the Tezos blockchain may have a container with 10,000 Tezos, and that could allow a maximum limit to public delegations of 125,000 Tezos, but by increasing the amount of Tezos to 20,000, then the total public delegable funds could go to 250,000. In this model, by increasing the base amount of Tezos owned by the node from 10,000 to 20,000, the amount of total capacity allowed for the public to join the node via delegation has increased by double as well.

Accordingly, one token (Token A) was converted to another token (Token B) and then staked to another blockchain node (or in other words, Token A is converted to Token B and then held in escrow to collect dividends). It should be noted that one of the features of this staking system is that if there is a malicious intent, the amount is lost. It is noted that the same principal can be applied from any blockchain to any other blockchain (e.g., $1a_1$ to $1b_2$).

Accordingly, in at least FIG. 7 it is illustrated an example for shifting of staking resources (e.g., selling (at least) one token and buying one or more tokens with a higher yield).

Figure 8:
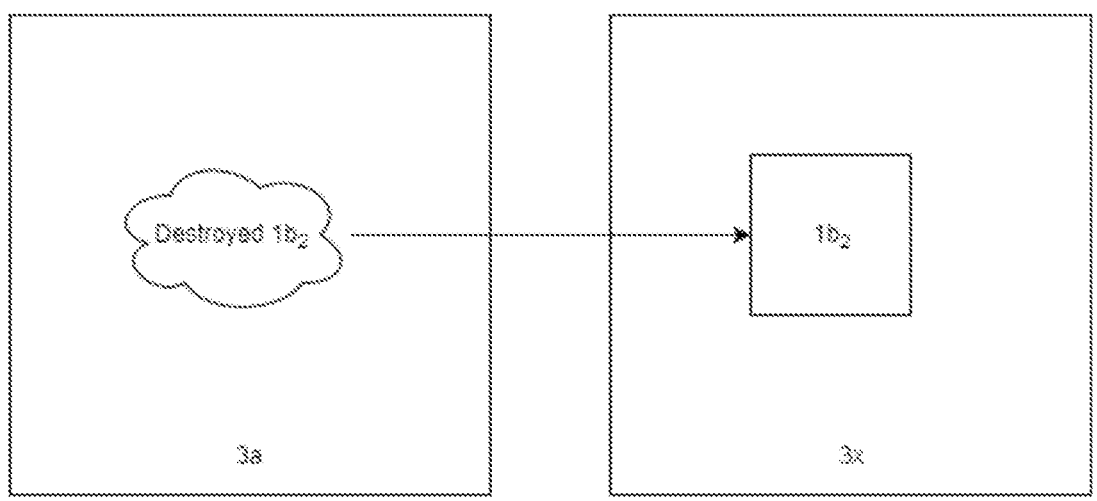
FIG. 8 is a functional block diagram illustrating an example of a deploying a resource from a first physical server located at a first geographical location to a second physical server located at a second geographical location.

FIG. 8 is a functional block diagram illustrating an example of a deploying a resource from a first physical server located at a first geographical location to a second physical server located at a second geographical location (the second geographical location may be at the same or a different location as the second geographical location). For example, in at least FIG. 8, a mining container with blockchain $1b_2$ (an original container) is on a first server e.g., server $3a$ which is located for example in San Francisco, Calif. U.S.A. while a second server e.g., server $3x$ which is located for example in Jurong East Singapore. Based on a certain criterion or criteria being met/determined (e.g., automatically detecting an overcrowding of miners on the first server and/or automatically detecting a reward yield fail(s) and/or etc.), the (original) mining container with blockchain $1b_2$ is cloned (e.g., duplicated) on the second server which is located in a different geographical location and the (original) mining container may be destroyed on and/or deleted from the first server. This provides numerous benefits, including but not limited to maximizing the returns.

According to at least FIG. 8, shifting of geography can be used to optimize rewards, for example, a "shard" of a blockchain may earn more rewards in regions with less miners.

Figure 9:
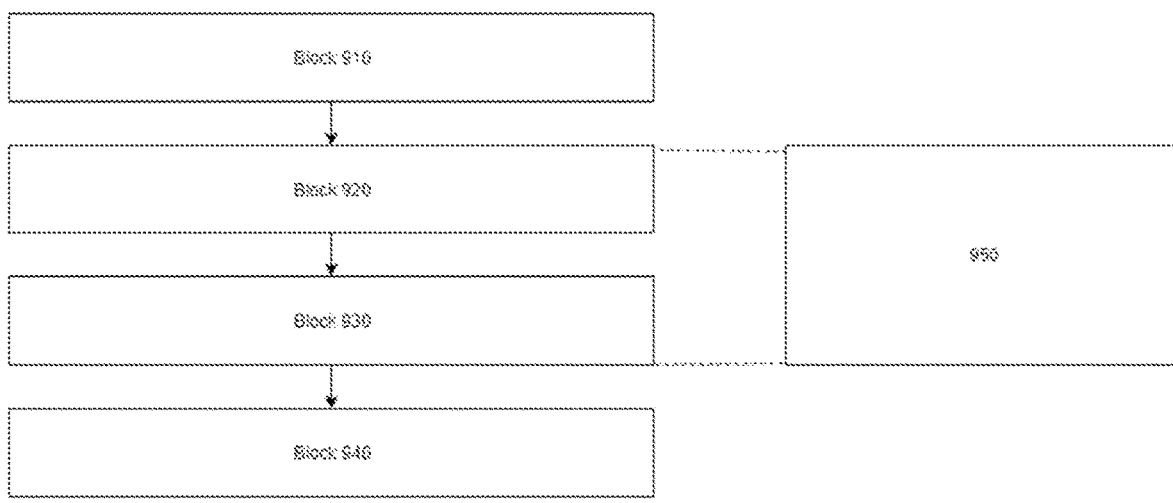
FIG. 9 is a flowchart illustrating a control processing method according to one or more embodiments described herein.

FIG. 9 is a flowchart illustrating a control processing method according to one or more embodiments described herein.

Blockchain systems are responsible for validating transactions, and sometimes during times of validating transactions, systems are required not to have any downtime. Accordingly, by monitoring the blockchain system, e.g., monitoring for when the blockchain system is responsible for something (e.g., preforming validation, executing function(s), allocating resources, calculating system requirements, etc.), this system can determine when it is acceptable (or more beneficial) to schedule maintenance and/or downtime, or a moment(s) to shift resource(s) for any of the situations disclosed herewith.

Furthermore, a blockchain system will require the system to perform actions at specific moments in time, and this processing method would provide information on when changes to the system can be made and/or maintained. For example, the Tezos blockchain lets the system know that at a certain time(s), the system needs to be available (and/or unavailable). However if maintenance (and/or other type of downtime) is needed, such as increasing the storage and/or other resources to support the server, then it would not be favorable to shut the system down. By implementing this type of control processing method, it would give information on when the system should be maintained.

For example, FIG. 9 illustrates an example that validation is predicable in proof of stake model and may therefore set maintenance windows ahead of time.

At Block 910, the system is responsible for confirming that a block is part of the official ledger.

After validation is performed in Block 910, at Block 920, the system performs no action, and is not responsible for any action, and no further action is needed. The server is expected to have full uptime to support the ecosystem, but it is not accountable for validating the block. In distributed ledgers like Tezos, a node or server can lose large rewards for not being active during the validation window, but there are cases where there are still rewards for keeping the server running, and sometimes it is allowed to collect another node's rewards if another responsible node is accidentally shut off. In the maintenance window, it is overall less risky to run patches or updates to the system.

After Block 920, at Block 930, the system performs no action, and is not responsible for any action, and no further action is needed.

After Block 930, at Block 940, the system is responsible for confirming that the block is part of the official ledger.

Figure 10:
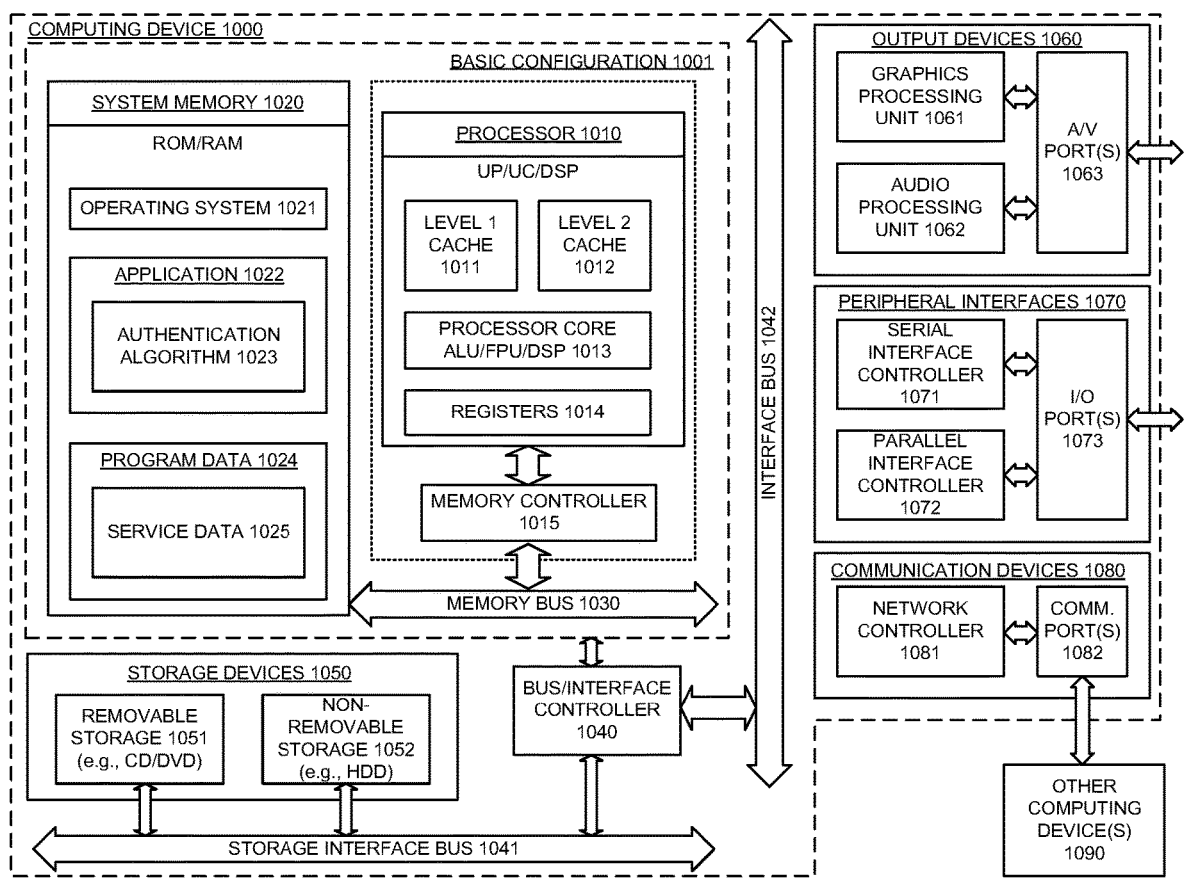
FIG. 10 is a circuit diagram of one aspect of a computing device/controller 1000 that works in conjunction with the elements of the present disclosure The headings provided herein are for convenience only and do not necessarily affect the scope or meaning of the claimed invention.

At Block 950, because the system is not responsible for any action, this time period can be used to maintain the server and/or even lower resources from the system FIG. 10 is a circuit diagram of one aspect of a computing device/controller 1000 that works in conjunction with the elements of the present disclosure. In a very basic configuration of computing device 1000, the computing device 1000 typically includes one or more processors 1010 and a system memory 1020. A memory bus 1030 can be used for communications between the processor 1010 and the system memory 1020.

Depending on the desired configuration, the one or more processor 1010 of computing device 1000 can be of any type including but not limited to a microprocessor, a microcontroller, a digital signal processor, or any combination thereof. Processor 1010 can include one more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP Core), or any combination thereof. A memory controller 1015 can also be used with the processor 1010, or in some implementations the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 typically includes an operating system 1021, one or more applications 1022, and program data 1024. Application 1022 includes an authentication algorithm 1023. Program Data 1024 includes service data 1025.

Computing device 1000 can have additional features or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 1000. Any such computer storage media can be part of the computing device 1000.

Computing device 1000 can also include an interface bus 1042 for facilitating communication from various interface devices (e.g., output interfaces, peripheral interfaces, communication interfaces, etc.) to the basic configuration 1001 via the bus/interface controller 1040. Example output devices 1060 include a graphics processing unit 1061 and an audio processing unit 1062, which can be configured to communicate to various external devices such as a display or speakers via one or more A/V ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication device 1080 includes a network controller 1081, which can be arranged to facilitate communications with one or more other computing devices 1090 over a network communication via one or more communication ports 1082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

It should be noted that the specifying circuit 112, the buffer specifier 114, the segmenter 311, the transformer 312, the periodogram computer 313, the delay assessment circuit 118, the pre-processors 110 and 111, the first and second threshold circuit 130 and 131, and/or the first and the second shift register 150, 151 may work in conjunction with computing device 600. In addition, it should be noted that the specifying circuit 112, the buffer specifier 114, the segmenter 311, the transformer 312, the periodogram computer 313, the delay assessment circuit 118, the pre-processors 110 and 111, the first and second threshold circuit 130 and 131, and/or the first and the second shift register 150, 151 may be comprised directly of the elements of computing device 1000 (i.e., elements 1010 and/or 1020).

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Exemplary embodiments are shown and described in the present disclosure. It is to be understood that the embodiments are capable of use in various other combinations and environments and are capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims.

We claim:

1. An apparatus for managing a system of a plurality of distributed ledgers, said apparatus comprising:
   a first server layer, wherein
      said first server layer includes at least one first server layer resource,
      said at least one first server layer resource being a resource environment for a first element of a first distributed ledger of the plurality of distributed ledgers,
      said first element being a first type of software application where said first type of software application being managed by and/or controlled by and/or assigned to a first user as the first user's node for the first distributed ledger,
      said first server layer includes a second first server layer resource,
      said second first server layer resource being a resource environment for a second element of a second distributed ledger of the plurality of distributed ledgers, and
      said second element being a second type of software application where said second type of software application being managed by and/or controlled by and/or assigned to the first user as the first user's node for the second distributed ledger;
   a first server and/or controller configured and/or programmed to control and/or contain said first server layer, wherein
      said first server allocates resources from said at least one first server layer resource to said second first server layer resource for hosting the second distributed ledger based on a determination that said at least one first server layer resource has available resources and/or based on a determination that said second first server layer resource needs available resources, the second first server layer resource utilizing the allocated resources in hosting the second distributed ledger,
      said first server at a first geographical location detects an overcrowding of miners on the first server and/or detects a reward yield fail, the first server including a mining container with a distributed ledger of the plurality of distributed ledgers,
         wherein the mining container is duplicated on the second server based on the detection of an overcrowding of miners on the first server and/or based on the detection of a reward yield fail, the second server located at a second geographical location that is a different location from the first geographical location, said first server destroys and/or deletes the mining container from the first server at the first geographical location after the duplication of the mining container on the second server at the second geographical location;
a second server layer, wherein
said first server allocates a third first server layer resource from said first server layer to said second server layer based on a determination that said first server layer has available resources and/or based on a determination that said second server layer needs available resources, the second server layer utilizing the allocated third first server layer resource to run a distributed ledger of the plurality of distributed ledgers; and
a plurality of storage devices, wherein
the first user's node for the first distributed ledger and a node of a second user, as the second user's node for the first distributed ledger, both use a first storage device of the plurality of storage devices as shared storage of the first distributed ledger, the second user's node for the first distributed ledger uses a second storage device of the plurality of storage devices as temporary storage for temporary operations for the first distributed ledger, such that the first user's node and the second user's node for the first distributed ledger share the same distributed ledger yet act as separate nodes, and
the first user's node for the second distributed ledger and another node of the second user, as the second user's node for the second distributed ledger, both use a third storage device of the plurality of storage devices as shared storage of the second distributed ledger, the second user's node for the second distributed ledger uses the second storage device of the plurality of storage devices as temporary storage for temporary operations for the second distributed ledger, such that first user's node and the second user's node for the second distributed ledger share the same distributed ledger yet act as separate nodes.

2. The apparatus according to claim 1, wherein said first server allocates said at least one first server layer resource and/or said second first server layer resource from said first server layer to said second server layer based on a determination that said first server layer has available resources and/or based on a determination that said second server layer needs available resources.

3. The apparatus according to claim 1,
wherein
said first server and/or controller configured and/or programmed to control and/or contain said second server layer, and
said first server allocates said at least one first server layer resource from said first server layer to said second server layer based on a determination that said first server layer has available resources and/or based on a determination that said second server layer needs available resources.

4. The apparatus according to claim 3, wherein
said second server layer includes a first second server layer resource, and
said first server allocates resources from said at least one first server layer resource to said first second server layer resource based on a determination that said at least one first server layer resource has available resources and/or based on a determination that said first second server layer resource needs available resources.

5. The apparatus according to claim 3, wherein
said second server layer includes a first second server layer resource, and
said first server allocates resources from said first second server layer resource to said at least one first server layer resource based on a determination that said first second server layer resource has available resources and/or based on a determination that said at least one first server layer resource needs available resources.

6. A method for managing a system of a plurality of distributed ledgers, wherein the system including a first server layer, a second server layer, a plurality of storage devices, and a first server and/or controller configured and/or programmed to control and/or contain said first server layer, said first server and/or controller configured and/or programmed to control and/or contain said second server layer, and a second server, said method comprising:
determining, by the first server, whether at least one first server layer resource has available resources and/or determining whether a second first server layer resource needs available resources, said at least one first server layer resource hosting a first distributed ledger of the plurality of distributed ledgers, said second first server layer resource hosting a second distributed ledger of the plurality of distributed ledgers,
wherein said first server layer includes said at least one first server layer resource,
said at least one first server layer resource being a resource environment for a first element of the first distributed ledger, and
said first element being a first type of software application where said first type of software application being managed by and/or controlled by and/or assigned to a first user as the first user's node for the first distributed ledger,
said first server layer includes a second first server layer resource,
said second first server layer resource being a resource environment for a second element of the second distributed ledger, and
said second element being a second type of software application where said second type of software application being managed by and/or controlled by and/or assigned to the first user as the first user's node for the second distributed ledger;
allocating, by the first server, resources from said at least one first server layer resource to said second first server layer resource for hosting the second distributed ledger based on said determination that said at least one first server layer resource has available resources and/or based on the determination that said second first server layer resource needs available resources, the second first server layer resource utilizing the allocated resources in hosting the second distributed ledger;
determining, by the first server, whether said first server layer has available resources and/or determining whether said second server layer needs available resources;
allocating, by the first server, a third first server layer resource from said first server layer to said second server layer based on the determination that said first server layer has available resources and/or based on the determination that said second server layer needs available resources, the second server layer utilizing the allocated third first server layer resource to run a distributed ledger of the plurality of distributed ledgers;

detecting, by the first server at a first geographical location, an overcrowding of miners on the first server and/or detecting a reward yield fail, the first server including a mining container with a distributed ledger of the plurality of distributed ledgers,
  wherein the mining container is duplicated on the second server based on the detection of an overcrowding of miners on the first server and/or based on the detection of a reward yield fail, the second server located at a second geographical location that is a different location from the first geographical location;
destroying and/or deleting the mining container from the first server at the first geographical location after the duplication of the mining container on the second server at the second geographical location,
wherein the first user's node for the first distributed ledger and a node of a second user, as the second user's node for the first distributed ledger, both use a first storage device of the plurality of storage devices as shared storage of the first distributed ledger, the second user's node for the first distributed ledger uses a second storage device of the plurality of storage devices as temporary storage for temporary operations for the first distributed ledger, such that the first user's node and the second user's node for the first distributed ledger share the same distributed ledger yet act as separate nodes,
wherein the first user's node for the second distributed ledger and another node of the second user, as the second user's node for the second distributed ledger, both use a third storage device of the plurality of storage devices as shared storage of the second distributed ledger, the second user's node for the second distributed ledger uses the second storage device of the plurality of storage devices as temporary storage for temporary operations for the second distributed ledger, such that first user's node and the second user's node for the second distributed ledger share the same distributed ledger yet act as separate nodes.

7. The method according to claim 6, said method further comprising:
  allocating said at least one first server layer resource and/or said second first server layer resource from said first server layer to said second server layer based on a determination that said first server layer has available resources and/or based on a determination that said second server layer needs available resources.

8. A non-transitory computer-readable medium having instructions stored thereon, said instructions are to be read and executed by one or more processors for causing the one or more processors to perform the method according to claim 6.

9. A method for managing a system of a plurality of distributed ledgers, wherein the system including a first server layer, a second server layer, a plurality of storage devices, a first server and/or controller configured and/or programmed to control and/or contain said first server layer, said first server and/or controller configured and/or programmed to control and/or contain said second server layer, and a second server, said method comprising:
  determining, by the first server, whether said first server layer has available resources and/or determining whether said second server layer needs available resources;
  allocating, by the first server, at least one first server layer resource from said first server layer to said second server layer based on the determination that said first server layer has available resources and/or based on the determination that said second server layer needs available resources, the second server layer utilizing the allocated said at least one server layer resource to run a distributed ledger of the plurality of distributed ledgers;
    wherein said first server layer includes said at least one first server layer resource, said at least one first server layer resource hosting a first distributed ledger of the plurality of distributed ledgers,
      said at least one first server layer resource being a resource environment for a first element of the first distributed ledger, and
      said first element being a first type of software application where said first type of software application being managed by and/or controlled by and/or assigned to a first user as the first user's node for the first distributed ledger,
  determining, by the first server, whether a second first server layer resource has available resources and/or determining whether a third first server layer resource needs available resources, said second first server layer resource hosting a second distributed ledger of the plurality of distributed ledgers, said third first server layer resource hosting a third distributed ledger of the plurality of distributed ledgers,
    wherein said first server laver includes said second first server layer resource and said third first server layer resource,
      said second first server layer resource being a resource environment for a second element of the second distributed ledger, and
      said second element being a second type of software application where said second type of software application being managed by and/or controlled by and/or assigned to the first user as the first user's node for the second distributed ledger;
  allocating, by the first server, resources from said second first server layer resource to said third first server layer resource for hosting the third distributed ledger based on said determination that said second first server layer resource has available resources and/or based on the determination that said third first server layer resource needs available resources, the third first server layer resource utilizing the allocated resources in hosting the third distributed ledger;
  detecting, by the first server at a first geographical location, an overcrowding of miners on the first server and/or detecting a reward yield fail, the first server including a mining container with a distributed ledger of the plurality of distributed ledgers,
    wherein the mining container is duplicated on the second server based on the detection of an overcrowding of miners on the first server and/or based on the detection of a reward yield fail, the second server located at a second geographical location that is a different location from the first geographical location;
  destroying and/or deleting the mining container from the first server at the first geographical location after the duplication of the mining container on the second server at the second geographical location,
  wherein the first user's node for the first distributed ledger and a node of a second user, as the second user's node for the first distributed ledger, both use a first storage device of the plurality of storage devices as shared storage of the first distributed ledger, the second user's node for the first distributed ledger uses a second storage device of the plurality of storage devices as temporary storage for temporary operations for the first distributed ledger, such that the first user's node and the second user's node for the first distributed ledger share the same distributed ledger yet act as separate nodes, wherein the first user's node for the second distributed ledger and another node of the second user, as the second user's node for the second distributed ledger, both use a third storage device of the plurality of storage devices as shared storage of the second distributed ledger, the second user's node for the second distributed ledger uses the second storage device of the plurality of storage devices as temporary storage for temporary operations for the second distributed ledger, such that first user's node and the second user's node for the second distributed ledger share the same distributed ledger yet act as separate nodes.

10. The method according to claim 9, wherein said second server layer includes a first second server layer resource, said method further comprising:

allocating resources from said at least one first server layer resource to said first second server layer resource based on a determination that said at least one first server layer resource has available resources and/or based on a determination that said first second server layer resource needs available resources.

11. The method according to claim 9, wherein said second server layer includes a first second server layer resource, said method further comprising:

allocating resources from said first second server layer resource to said at least one first server layer resource based on a determination that said first second server layer resource has available resources and/or based on a determination that said at least one first server layer resource needs available resources.

12. A non-transitory computer-readable medium having instructions stored thereon, said instructions are to be read and executed by one or more processors for causing the one or more processors to perform the method according to claim 9.

* * * * *